(12) United States Patent
Fujihara et al.

(10) Patent No.: US 10,703,077 B2
(45) Date of Patent: Jul. 7, 2020

(54) FORMED BODY

(71) Applicant: FUJIFILM Corporation, Tokyo (JP)

(72) Inventors: Yusuke Fujihara, Kanagawa (JP);
Norichika Kojima, Kanagawa (JP);
Shogo Katano, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/359,052

(22) Filed: Mar. 20, 2019

(65) Prior Publication Data

US 2019/0217581 A1 Jul. 18, 2019

Related U.S. Application Data

(63) Continuation of application No. PCT/JP2017/033839, filed on Sep. 20, 2017.

(30) Foreign Application Priority Data

Sep. 29, 2016 (JP) ................. 2016-190815

(51) Int. Cl.
| | |
|---|---|
| B32B 23/08 | (2006.01) |
| G02B 1/18 | (2015.01) |
| B32B 23/20 | (2006.01) |
| B32B 25/08 | (2006.01) |
| B32B 23/04 | (2006.01) |
| B32B 7/12 | (2006.01) |
| G02B 1/04 | (2006.01) |
| G08B 13/196 | (2006.01) |

(52) U.S. Cl.
CPC ............... *B32B 23/08* (2013.01); *B32B 7/12* (2013.01); *B32B 23/04* (2013.01); *B32B 23/20* (2013.01); *B32B 25/08* (2013.01); *G02B 1/04* (2013.01); *G02B 1/18* (2015.01); *G08B 13/19617* (2013.01); *B32B 2457/00* (2013.01)

(58) Field of Classification Search
CPC  B32B 23/08; B32B 23/20; B32B 7/12; B32B 23/04; B32B 25/08; G02B 1/18; G02B 1/04; C09K 3/18
See application file for complete search history.

(56) References Cited

U.S. PATENT DOCUMENTS

2006/0196413 A1  9/2006 Sugimura

FOREIGN PATENT DOCUMENTS

| JP | 60-101042 A | 6/1985 |
|---|---|---|
| JP | 5-088725 B2 | 12/1993 |

(Continued)

OTHER PUBLICATIONS

Translation of JPH06190972. (Year: 1994).*

(Continued)

*Primary Examiner* — Catherine A. Simone
(74) *Attorney, Agent, or Firm* — Edwards Neils LLC; Jean C. Edwards, Esq.

(57) ABSTRACT

A formed body includes a base material, an adhesive layer, and a cellulose acylate film. The base material is formed of a thermoplastic resin and is in the form of a transparent sheet. The adhesive layer bonds the base material and the cellulose acylate film. The cellulose acylate film has a thickness in a range of 15 μm or more and 100 μm or less, and is formed of cellulose acylate including an ester oligomer or a sugar ester derivative.

6 Claims, 3 Drawing Sheets

(56) References Cited

FOREIGN PATENT DOCUMENTS

| | | |
|---|---|---|
| JP | 6-143339 A | 5/1994 |
| JP | 6-190972 A | 7/1994 |
| JP | 2013-099879 A | 5/2013 |
| JP | 2017-186516 A | 10/2017 |
| WO | 2006/094313 A2 | 9/2006 |

OTHER PUBLICATIONS

Translation of JP2013099879. (Year: 2013).*
International Search Report issued in PCT/JP2017/033839 dated Nov. 7, 2017.
Written Opinion issued in PCT/JP2017/033839 dated Nov. 7, 2017.
International Preliminary Report on Patentability issued by WIPO dated Apr. 2, 2019, in connection with International Patent Application No. PCT/JP2017/033839.
Office Action, issued by the Japanese Patent Office dated Jun. 4, 2019, in connection with Japanese Patent Application No. 2016-190815.

* cited by examiner

FORMED BODY

CROSS-REFERENCE TO RELATED APPLICATIONS

This application is a Continuation of PCT International Application No. PCT/JP2017/033839 filed on 20 Sep. 2017, which was published under PCT Article 21(2) in Japanese, and which claims priority under 35 U.S.C § 119(a) to Japanese Patent Application No. 2016-190815 filed on 29 Sep. 2016. The above applications are hereby expressly incorporated by reference, in their entirety, into the present application.

BACKGROUND OF THE INVENTION

1. Field of the Invention

The present invention relates to a formed body.

2. Description of the Related Art

Glass is widely used in products requiring transparency such as a cover of a surveillance camera and a case of an incubator. Further, in a case where impact resistance and/or workability is required, instead of glass, a synthetic resin such as acryl or polycarbonate is used.

For example, JP1985-101042A (JP-S60-101042A) discloses a sheet-like material comprising a base material formed of acryl, polycarbonate, or the like, and an antifogging film which is bonded to the base material with an adhesive (hereinafter, simply referred to as a film). The film has a function of suppressing deterioration of transparency caused by fogging due to condensation or the like, that is, has antifogging properties. The film is a cellulose acylate film formed of cellulose acylate, and includes a saponified layer containing saponified cellulose acylate by subjecting at least one of film surfaces of the cellulose acylate film to a saponification treatment as a hydrophilization treatment. The saponified layer exhibits antifogging properties. The thickness of the film is set to about 20 µm to 100 µm.

Similarly, JP1993-088725B (JP-H05-088725B) discloses an antifogging plate in which a base material and a film are bonded with an adhesive. The film is formed of triacetyl cellulose or the like. The thickness of the film is set to about 190 µm or 250 µm.

As disclosed in JP2013-099879A, there is a film in which a polyester compound is contained in cellulose ester as an additive. The thickness of the film is set to 10 µm or more and 90 µm or less.

SUMMARY OF THE INVENTION

In the films described in JP1985-101042A (JP-S60-101042A) and JP1993-088725B (JP-H05-088725B), the gas generated from the base material, so-called outgas, is accumulated between the base material and the film. In a case where outgas exists in the form of bubbles between the base material and the film, the transparency of the film is impaired. In addition, the outgas also causes the film to be peeled off from the base material. Further, for the films described in JP1985-101042A (JP-S60-101042A) and JP1993-088725B (JP-H05-088725B), it is difficult to perform processing along the shape of the end portion of the base material and to perform forming along a curved surface such as roughness, and thus the use thereof is limited. The film described in JP2013-099879A is only applied for use as a film.

An object of the present invention is to provide a formed body which reduces the influence of outgas and has further excellent transparency, workability, and formability.

A formed body according to the present invention comprises: a transparent base material, an adhesive layer, and a film. The base material is formed of a thermoplastic resin. The adhesive layer is provided on a surface of the base material. The film is provided on a surface of the adhesive layer opposite to the base material and has a thickness in a range of 15 µm or more and 100 µm or less. The film is formed of cellulose acylate including an ester oligomer or a sugar ester derivative.

It is preferable that the ester oligomer has a molecular weight of 400 or more and 10000 or less.

It is preferable that a mass of the ester oligomer at most 30% with respect to a mass of the cellulose acylate.

It is preferable that a mass of the sugar ester derivative is at most 15% with respect to a mass of the cellulose acylate.

It is preferable that the film has a cellulose acylate layer that is provided on a side close to the adhesive layer and is formed of the cellulose acylate, and a saponified layer that is provided on a side opposite to the adhesive layer and contains the cellulose acylate which is saponified, and in a case where an amount of acyl groups in the saponified layer is X and an amount of acyl groups in the cellulose acylate layer is Y, an acyl group ratio determined by X/Y is at most 0.7.

It is preferable that the base material is formed of acryl or polycarbonate. The base material may be formed in a curved sheet shape.

The formed body according to the present invention reduces the influence of outgas and has further excellent transparency, workability, and formability.

DESCRIPTION OF THE PREFERRED EMBODIMENTS

Figure 1:
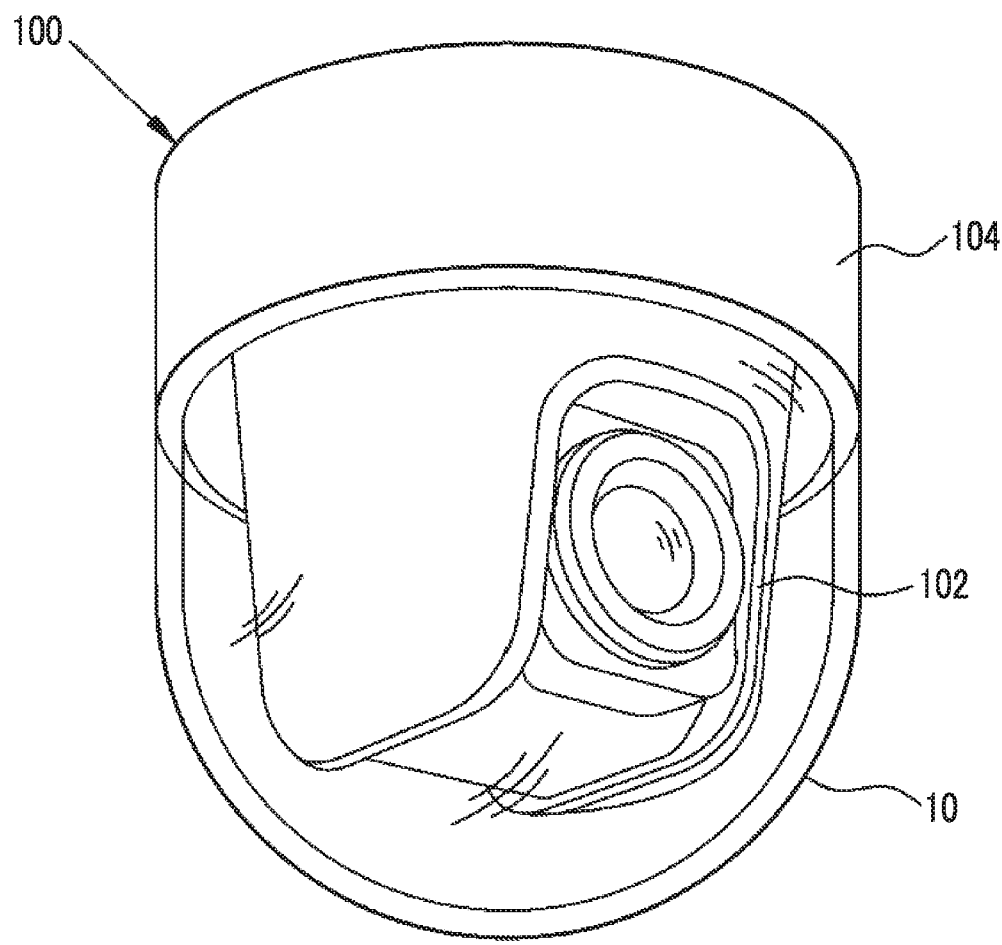
FIG. 1 is an explanatory view showing a usage mode of a formed body implementing the present invention.

In FIG. 1, a cover as an example of a formed body 10 having a three-dimensional shape is used for those which are required have transparency, that is, those which are required to allow an object in front of the cover to be seen through the cover, for example, a surveillance camera 100. The surveillance camera 100 includes a camera main body 102 having an imaging function, a support member 104 that supports the camera main body 102, and a cover for covering the camera main body 102, and the cover is a formed body 10. In this example, the formed body 10 is formed in a dome shape.

Figure 2:
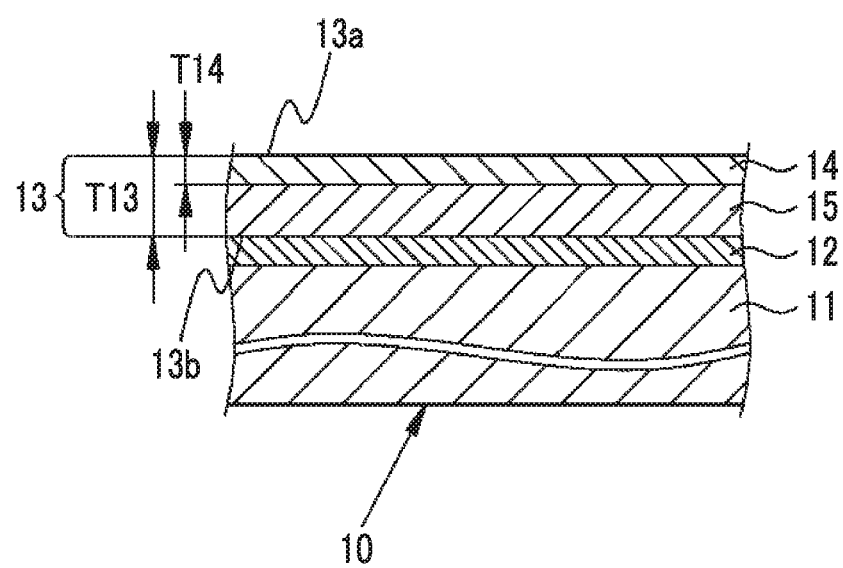
FIG. 2 is a schematic cross-sectional view of a part of the formed body implementing the present invention.

As shown in FIG. 2, the formed body 10 comprises a base material 11 as a formed body main body, an adhesive layer 12, and a cellulose acylate film 13. The thickness of the formed body 10 is not particularly limited and for example, the thickness is set to be in a range of 1 mm or more and 50 mm or less. In the embodiment, the thickness of the formed body 10 is, for example, 5 mm. The cellulose acylate film 13 corresponds to "film" described in the claim.

The base material 11 is formed of a thermoplastic resin. As the thermoplastic resin, polycarbonate (hereinafter, referred to as PC) or acryl is preferable. In the embodiment, acryl is used. The reason why polycarbonate or acryl is used is that polycarbonate and acryl have high transparency and are lightweight and excellent in durability as compared with glass and are more easily formed in a desired shape.

The base material 11 is transparent. The term "transparent" means having an imagable light transmittance. Here, the light includes visible light (a wavelength range of about 380 nm or more and 750 nm or less) and a near infrared ray (a wavelength range of about 750 nm or more and about 2500 nm or less). Note that the base material 11 may be colorless or colored (colored).

The base material 11 is formed in a curved sheet shape, and in the embodiment, the base material is formed in a dome shape. However, the base material is not limited to the sheet-like base material 11 but may be a lens-like base material. In addition, the shape of the base material is not limited to the dome shape and may be formed in a desired three-dimensional shape. On at least one surface of the base material 11, the adhesive layer 12 is provided. This base material 11 has a curved surface, but in FIG. 2, for the convenience of description, the surface of the base material 11 is drawn on a plane. The thickness of the base material 11 is not particularly limited, and is set to be, for example, in a range of 1 mm or more and 50 mm or less. In the embodiment, the thickness of the base material 11 is, for example, 2 mm.

The adhesive layer 12 is for bonding the base material 11 and the cellulose acylate film 13 or cause the base material 11 and the cellulose acylate film 13 to adhere to each other. The thickness of the adhesive layer 12 is not particularly limited, and is set to, for example, in a range of 1 μm or more and 50 μm or less. In the embodiment, the thickness of the adhesive layer 12 is, for example, 15 μm. In the specification, the term "bond" means that objects to be attached (the cellulose acylate film 13 and the base material 11 in the embodiment) are attached to be integrated. In addition, the term "adhere" is a kind of bonding and means that even after a certain period of time has elapsed after an object is attached to an attaching target, a change in attachment power (pressure sensitive adhesion) is small and the object is attached in such a state that the attached object can be peeled off, if necessary.

The adhesive layer 12 is preferably formed of any one of a vinyl acetate resin, an epoxy resin, a vinyl chloride resin, an acrylic pressure sensitive adhesive, a silicone-based pressure sensitive adhesive, or a rubber-based pressure sensitive adhesive, and among these, an acrylic pressure sensitive adhesive or a silicone-based pressure sensitive adhesive is more preferable. In the embodiment, an acrylic pressure sensitive adhesive is used. The adhesive layer 12 preferably has a usable temperature, that is, a heat resistant temperature of 150° C. or higher. The usable temperature can be selected depending on the temperature during a bonding process, adhesiveness, smoothness, and/or coloring. The adhesiveness means, for example, the degree of adhesion between objects to be attached. The smoothness means, for example, the degree of roughness on the surface. In addition, the adhesive in the present invention is preferably selected from the viewpoints of durability under an environment of high temperature and high humidity after bonding, turbidity, outgas, and/or transparency of the formed body, in addition to the strength of the adhesive layer 12.

The cellulose acylate film 13 is formed of cellulose acylate. In the embodiment, cellulose acylate is cellulose triacetate (triacetyl cellulose, hereinafter referred to as TAC) but is not limited to TAC. Other cellulose acylates different from TAC may be used. By using cellulose acylate, rainbow unevenness is suppressed, and as a result, transparency is secured. The rainbow unevenness is a light interference phenomenon caused by reflection of light on the film surface and refraction of incidence rays on each film surface in a case where light is emitted. The glass transition point of the cellulose acylate used in the cellulose acylate film 13 is preferably 150° C. or higher and 180° C. or lower. The cellulose acylate film 13 is provided on the base material 11 with the adhesive layer 12 interposed therebetween. That is, the cellulose acylate film 13 is provided on a surface of the base material 11 opposite to the adhesive layer 12.

The cellulose acylate will be described in detail below. In the cellulose acylate, it is particularly preferable that a ratio of esterification of hydroxy groups of cellulose with a carboxylic acid, that is, a degree of substitution of acyl groups (hereinafter, also referred to as acyl group substitution degree) satisfies all conditions of Expressions (1) to (3). In Expressions (1) to (3), A and B are both acyl group substitution degrees, the acyl group of A is an acetyl group, and the acyl group of B has 3 to 22 carbon atoms.

$$2.0 \leq A+B \leq 3.0 \tag{1}$$

$$0 \leq A \leq 3.0 \tag{2}$$

$$0 \leq B \leq 2.9 \tag{3}$$

A glucose unit, which constitutes cellulose and forms a β-1,4 bond, has hydroxy groups at the 2-position, 3-position, and 6-position. The cellulose acylate is a polymer obtained by esterifying a part or all of these hydroxy groups of cellulose and thus substituting hydrogen of the hydroxy groups with an acyl group having 2 or more carbon atoms. In a case where one hydroxy group in the glucose unit is 100% esterified, the substitution degree becomes 1. Therefore, in a case of the cellulose acylate, each of the hydroxy groups at the 2-position, 3-position, and 6-position is 100% esterified and the substitution degree becomes 3.

Here, in a case where the acyl group substitution degree at the 2-position of the glucose unit is DS2, the acyl group substitution degree at the 3-position is DS3, and the acyl group substitution degree at the 6-position is DS6, a total acyl group substitution degree obtained by "DS2+DS3+DS6" is preferably 2.00 to 2.97 and is 2.86 in the embodiment.

The acyl group may be only a single kind, or two or more kinds of acyl groups may be used. In a case where two or more kinds of acyl groups are used, one of these acyl groups is preferably an acetyl group. In a case where the total sum of substitution degrees of hydrogen in the hydroxy groups at the 2-position, 3-position and 6-position with an acetyl group is defined as DSA and the total sum of substitution degrees of hydrogen in the hydroxy groups at the 2-position, 3-position and 6-position with an acyl group other than the acetyl group is defined as DSB, it is preferable that a value of "DSA+DSB" is 2.20 to 2.86 and particularly preferably 2.40 to 2.80. The DSB is preferably 1.50 or more and particularly preferably 1.7 or more. In the DSB, the percentage of the substituent for the hydroxy group at the 6-position is preferably 28% or higher, more preferably 30% or higher, even more preferably 31% or higher, and particularly preferably 32% or higher. In addition, the value of (DSA+DSB) at the 6-position of the cellulose acylate is preferably 0.75 or more, more preferably 0.80 or more, and particularly preferably 0.85 or more.

The acyl group having 2 or more carbon atoms may be an aliphatic group or an aryl group and is not particularly limited. Examples thereof include alkylcarbonyl esters, alkenylcarbonyl esters or aromatic carbonyl esters and aromatic alkylcarbonyl esters of cellulose, and each of these cellulose esters may have a further substituted group. Preferable substituents are a propionyl group, a butanoyl group, a pentanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a t-butanoyl group, a cyclohexanecarbonyl group, an oleoyl group, a benzoyl group, a naphthylcarbonyl group, a cinnamoyl group, and the like. Among these, a propionyl group, a butanoyl group, a dodecanoyl group, an octadecanoyl group, a t-butanoyl group, an oleoyl group, a benzoyl group, a naphthylcarbonyl group, a cinnamoyl group, and the like are more preferable, and a propionyl group and a butanoyl group are particularly preferable.

A thickness T13 of the cellulose acylate film 13 is set to be in a range of 15 μm or more and 100 μm or less. By setting the thickness T13 to 15 μm or more, compared to a case where the thickness is less than 15 μm, the occurrence of breakage, wrinkles, and the like during forming are suppressed. By setting the thickness T13 to 100 μm or less, compared to a case where the thickness is less than 100 μm, easiness of processing along the shape of the end portion of the base material 11 (hereinafter, referred to as workability), and ease of forming into a curved surface having a dome shape and roughness (hereinafter, referred to as formability) are excellent. The thickness T13 is more preferably in a range of 18 μm or more and 60 μm or less, and even more preferably in a range of 20 μm or more and 50 μm or less. In the embodiment, the thickness T13 is set to, for example, 40 μm.

The thickness T13 is correlated with the moisture permeability of the cellulose acylate film 13. Specifically, as the thickness T13 decreases, the moisture permeability increases, that is, the moisture permeability of the cellulose acylate film 13 is good. It is considered that the outgas is generated by evaporation of moisture or the like contained in the base material 11 and/or the adhesive layer 12 formed of a resin such as acryl, and the cellulose acylate film 13 having moisture permeability allows permeation of the outgas. In a case where moisture permeability is evaluated under conditions of 40° C. and 90% RH (relative humidity) based on Japanese Industrial Standards JIS Z-0208, the moisture permeability of the cellulose acylate film 13 is preferably 550 g/(m$^2$·24 h) or more. Even in a case where outgas is generated, in the formed body 10, the outgas passes through the cellulose acylate film 13 and is released to the outside, and thus, the generation of the bubbles and/or peeling-off is suppressed. Accordingly, it is preferable that the thickness T13 of the cellulose acylate film 13 is in the above range from the viewpoint of moisture permeability. In addition, the moisture permeability of the cellulose acylate film 13 is correlated with the mass ratio of a plasticizer with respect to the mass of the cellulose acylate. The mass ratio will be described in detail later. As the mass ratio of the plasticizer decreases, the moisture permeability increases. In addition, the kind of plasticizer is also related to the moisture permeability of the cellulose acylate film 13. In a case where a cellulose acylate film 13 containing an ester oligomer as a plasticizer is compared with a cellulose acylate film 13 containing a sugar ester derivative as a plasticizer, at the same film thickness and the same plasticizer mass ratio, from the viewpoint of moisture permeability, the former is further excellent. Further, since the cellulose acylate film 13 is formed of cellulose acylate, compared to a case where the film is formed of polyethylene terephthalate (hereinafter, referred to as PET), the moisture permeability is further excellent. The cellulose acylate film 13 having further excellent moisture permeability is clearly laminated on the base material 11 to improve the designability of the formed body 10. Further, since the attached state is maintained for a long period of time, the durability of the formed body 10 is improved.

The cellulose acylate film 13 has a two-layer structure including a saponified layer 14 and a cellulose acylate layer 15, and the cellulose acylate layer 15 is disposed on a side close to the base material 11, that is, the adhesive layer 12. The saponified layer 14 forms one film surface 13a (hereinafter, referred to as a first film surface) on a surface of the cellulose acylate film 13 opposite to the adhesive layer 12 and the cellulose acylate layer 15 forms the other film surface 13b (hereinafter, referred to as a second film surface) of the cellulose acylate film 13 close to the adhesive layer 12.

The saponified layer 14 is provided for imparting antifogging properties to the cellulose acylate film 13. Therefore, in a case where the antifogging function is not required, the saponified layer 14 may not be provided. The antifogging properties include initial antifogging properties and long-term antifogging properties. The initial antifogging properties refer to a function of preventing instantaneous dew condensation. The long-term antifogging properties refer to a function of preventing dew condensation for a long period of time. In the embodiment, the saponified layer 14 has both initial antifogging properties and long-term antifogging properties. The saponified layer 14 includes saponified cellulose acylate, in this example, saponified TAC.

The cellulose acylate layer 15 is formed of cellulose acylate, in this example, TAC including an ester oligomer. The cellulose acylate layer 15 does not contain saponified cellulose acylate.

In a case where the amount of acyl groups of the saponified layer 14 is X and the amount of acyl groups of the cellulose acylate layer 15 is Y, an acyl group ratio determined by X/Y (hereinafter, referred to as an acyl group ratio) is at most 0.7, that is, 0.7 or less, and is, for example, 0.3 in the embodiment. As the acyl group ratio decreases, the amount of acyl groups of the saponified layer 14 with respect to the cellulose acylate layer 15 decreases, which means that more acyl groups are saponified and thus become hydrophilic groups in the saponification treatment of the cellulose acylate film 13.

The acyl group ratio is related to initial antifogging properties. Specifically, as the acyl group ratio decreases, initial antifogging properties are improved. In a case where the acyl group ratio is 0.7 or less, that is, in a range of 0 or more and 0.7 or less, compared to a case where the acyl group ratio is more than 0.7, excellent initial antifogging properties are exhibited. The acyl group ratio is more preferably in a range of 0.01 or more and 0.6 or less and even more preferably in a range of 0.05 or more and 0.5 or less.

The amount of acyl groups X and the amount of acyl groups Y are obtained as acyl group spectrum intensities which are obtained by an attenuated total reflection (ATR) method (hereinafter, referred to as an ATR method) of Fourier transform infrared spectroscopy (FT-IR, hereinafter, referred to as FT-IR). Specifically, the spectrum intensity of the signal of the acyl group of the cellulose acylate is corrected (standardized) with the common signal spectrum intensity of a cellulose-based polymer. In the embodiment, since TAC is used as the cellulose acylate, the acyl group is an acetyl group and the signal of the acetyl group is 1210 $cm^{-1}$. It is preferable that the common signal of a cellulose-based polymer is 1030 $cm^{-1}$. Then, the spectrum intensities of the signals of the acyl groups of the cellulose acylate obtained by correction are obtained as the amount of acyl groups X and the amount of acyl groups Y, respectively. Thus, the amount of acyl groups X and the amount of acyl groups Y are indexes which are replaced by the number of acyl groups.

The ATR method of FT-IR is a method of obtaining a spectrum intensity by allowing light to penetrate through a measurement sample, as already known, and the obtained spectrum intensity is not the one measured at the surface of the measurement sample in a strict sense. In a case of performing measurement at a measurement angle of 45 degrees using a diamond prism as one method in the ATR method of general FT-IR, the penetration depth of light from the surface of the measurement sample is about 2 to 3 μm. Since the saponified layer 14 of the embodiment is very thin as described later, as the penetration depth of light becomes larger than 2 μm, the reliability as the amount of acyl groups obtained for the saponified layer 14 is low. The spectrum intensity in a depth range of 2 μm from the first film surface 13a of the cellulose acylate film 13 is preferably obtained as the amount of acyl groups X. Also, in the embodiment, the penetration depth of light is set to 2 μm and the spectrum intensity in a depth range of 2 μm or less from the first film surface 13a is set to the amount of acyl groups X.

In the same manner, the spectrum intensity in a depth range of 2 μm from the second film surface 13b of the cellulose acylate film 13 is preferably obtained as the amount of acyl groups Y and the same is also applied in the embodiment. In a case where the saponified layer forms not only the first film surface 13a but also the second film surface 13b, that is, the saponified layer is provided on both surfaces of the cellulose acylate film 13 and the cellulose acylate layer is provided between the respective saponified layers, it is preferable that the amount of acyl groups at the center of the cellulose acylate film 13 in a thickness direction is obtained and this obtained value is used as the amount of acyl groups Y from the viewpoints of simplicity and reliability as the amount of acyl groups obtained for the cellulose acylate film 13. In a case where it is difficult to obtain the amount of acyl groups Y in the second film surface 13b in the above-described manner, the amount of acyl groups may be obtained by another method in which the cellulose acylate film 13 is dissolved in methylene chloride and/or chloroform, and the like, a film is formed from this solution, and the amount of acyl groups in the film surface of this film is obtained by infrared absorption spectrometry (IR), and the like.

Long-term antifogging properties are related to a contact angle after 15 seconds. The contact angle after 15 seconds is the characteristic showing that a sufficient amount of hydrophilic components are present on the first film surface 13a of the cellulose acylate film 13. In such a case where the first film surface 13a contains a large amount of hydrophilic components, a state in which condensed water droplets sufficiently wet-spread on the first film surface 13a can be maintained and thus this case is considered to be effective on long-term antifogging properties. In a case where the contact angle after 15 seconds is 35° or less, particularly, the long-term antifogging properties tend to be improved. In the first film surface 13a, the contact angle after 15 seconds is 35° or less and is, for example, 25° in the embodiment. The contact angle after 15 seconds is related to long-term antifogging properties. However, in order to set the contact angle after 15 seconds to 35° or less, the amount of acyl groups X of the first film surface 13a is controlled such that the acyl group ratio is 0.7 or less. The contact angle after 15 seconds is preferably 35° or less, more preferably 30° or less, and even more preferably 25° or less. The contact angle is obtained in consideration of time after pure water is added dropwise and the time is set to after 15 seconds. Thus, the cellulose acylate film 13 having excellent long-term antifogging properties is obtained. The contact angle after 15 seconds is the characteristic showing affinity with water on the film surface. In the measurement of the contact angle with respect to water, it has been found that a phenomenon that pure water is infiltrated into a hydrophilic portion (hereinafter, referred to as a hydrophilic film) formed in a film having a very small thickness on the surface of the saponified layer 14 or the film component comes out from the inside of the hydrophilic film or the like occurs as time elapses after pure water is added dropwise; however, by performing the measurement in 15 seconds after the dropwise addition, the hydrophilicity of the film surface corresponding to long-term antifogging properties can be measured.

The contact angle after 15 seconds is preferably measured with respect to the cellulose acylate film 13 after the humidity is adjusted. The treatment for humidity adjustment is preferably performed under the condition of an atmosphere at a temperature in a range of 23° C. or higher and 28° C. or lower and a relative humidity in a range of 55% or more and 65% or less and the humidity adjusting time is more preferably 1 hour or longer. In the embodiment, humidity adjustment is performed for 1 hour in an atmosphere at a temperature of 25° C. and a relative humidity of 60%. In this humidity adjustment treatment, the humidity of the entire cellulose acylate film 13 may be adjusted but it is sufficient that the humidity of at least the saponified layer 14 is adjusted.

In addition, by setting a thickness T14 of the saponified layer 14 (refer to FIG. 2) to be in a predetermined range, both initial antifogging properties and long-term antifogging properties are more reliably attained. The details are as follows. The acyl group ratio is correlated with the thickness T14 and the thickness T14 increases as the acyl group ratio decreases. The initial antifogging properties are further improved as the acyl group ratio decreases, as described above. Thus, it is found that as the thickness T14 increases, the initial antifogging properties are further improved.

Further, as the thickness T14 of the saponified layer 14 is increased from 0 (zero), the contact angle after 15 seconds is gradually reduced, but in a case where the thickness T14 is increased to a certain degree or more, the contact angle after 15 seconds is gradually increased. As reasons for the gradual increase, the following (1) and (2) can be considered. That is, (1) in a case where the conditions for saponification described later are strengthened to increase the thickness T14, the above-described hydrophilic film of which the contact angle after 15 seconds is reduced is reduced or (2) a retention region in which water is retained is excessively enlarged due to excessive large thickness T14, and as a result, water is infiltrated into the inside of the first film surface 13a. Since long-term antifogging properties are reliably exhibited at a contact angle after 15 seconds of 35° or less as described above, in a case where long-term antifogging properties are required, in a region where the contact angle after 15 seconds is gradually increased, the thickness T14 is preferably set such that the thickness corresponding to 35° is set to an upper limit. Thus, in addition to the initial antifogging properties, long-term antifogging properties are more reliably secured.

Thus, in order to more reliably exhibit initial antifogging properties and long-term antifogging properties, the thickness T14 is preferably in a range of 1 μm or more and 6 μm or less and is in a range of 2 μm or more and 5 μm or less in the embodiment. That is, in a case where the thickness T14 is 1 μm or more, compared to a case where the thickness is less than 1 μm, initial antifogging properties are more reliably exhibited and in a case where the thickness is 6 μm or less, compared to a case where the thickness is larger than 6 μm, long-term antifogging properties are more reliably exhibited.

The thickness T14 is obtained by the following manner in the embodiment. A sample sampled from the cellulose acylate film 13 is immersed in dichloromethane for 24 hours. The undissolved sample in the immersion is dried and the thickness of the dried sample is measured 3 times. The average value of the three measurement values is used as the thickness T14.

In the cellulose acylate film 13, the amount of C=O (carboxyl groups) of acyl groups bonded to hydroxyl group components of cellulose in a depth range of 2 μm from the first film surface 13*a* is preferably 70% or less with respect to the amount of C=O of acyl groups bonded to hydroxyl group components of cellulose in the second film surface 13*b*, and is set to be in a range of 30% or more and 70% or less with respect to the amount of C=O of acyl groups bonded to hydroxyl group components of cellulose in the second film surface in the embodiment. For example, in a case where the acyl group ratio is not obtained, the contact angle after 15 seconds is set to 20° or less and the amount of C=O of the acyl groups bonded to the hydroxyl group components of the cellulose groups in a depth range of 2 μm from the first film surface 13*a* is set to 70% or less with respect to the amount of C=O of the acyl groups bonded to the hydroxyl group components of the cellulose groups in the second film surface 13*b*, thereby exhibiting initial antifogging properties and long-term antifogging properties.

The cellulose acylate forming the cellulose acylate film 13 includes an ester oligomer or a sugar ester derivative. These ester oligomer and sugar ester derivative function as a plasticizer for the cellulose acylate film 13. Thus, the following effects (1) to (4) are obtained in the formed body 10. That is, the effects of (1) by increasing the moisture permeability of the cellulose acylate film 13, outgas permeates the cellulose acylate film 13 and the generation of bubbles and/or peeling-off is suppressed; (2) by adjusting the kind and/or mass of the plasticizer, the workability and formability of the cellulose acylate film 13 are improved and further flexibility is also improved; (3) there is a case where heating forming is performed in forming of a curved surface, and even in this case, precipitation of a plasticizer and/or an additive on the surface during heating forming and volatilization of the plasticizer and/or the additive at the forming temperature are suppressed; and (4) the thickness T14 of the saponified layer 14 and/or the contact angle can be reduced and an increase in the contact angle or the like by transition of the plasticizer and/or the additive to the surface after the heating forming is suppressed are obtained.

As a plasticizer, of the above 2 kinds, the ester oligomer is more preferable. More specifically, an ester oligomer having a molecular weight in a range of 400 or more and 10000 or less is preferably included as a plasticizer, and the cellulose acylate film 13 of the embodiment also includes the ester oligomer. Since the molecular weight distribution of the ester oligomer is different from the molecular weight distribution of the above-described plasticizer having a molecular weight of less than 400, the molecular weight of the ester oligomer can be obtained using weight-average molecular weight and number average molecular weight by gel permeation chromatography (GPC), number average molecular weight measurement methods by terminal functional group amount measurement and osmotic pressure measurement, viscosity average molecular weight by viscosity measurement, and the like. In the embodiment, the molecular weight of the ester oligomer is obtained by a number average molecular weight measurement method by measuring a hydroxyl group or an acid group of ester as a terminal functional group. By using the ester oligomer having a molecular weight in a range of 400 or more and 10000 or less as a plasticizer, in a case of attaching the cellulose acylate film 13 to an attaching target, for example, an acrylic dome or a PC plate, the so-called handleability, such as ease of attachment and/or ease of reattachment, is reliably improved. In addition, by using the ester oligomer as a plasticizer, compared to a case of using a general plasticizer monomer having a molecular weight of less than 400, precipitation in the first film surface 13*a* is more reliably suppressed and the contact angle of the first film surface 13*a* after 15 seconds is easily decreased, thereby more reliably exhibiting long-term antifogging properties. As the molecular weight of the ester oligomer increases, long-term antifogging properties are improved, and as the molecular weight of the ester oligomer decreases, the compatibility with the cellulose acylate are improved. Thus, the molecular weight of the ester oligomer is more preferable in a molecular weight range of 700 or more and 5000 or less and even more preferably in a range of 900 or more and 3000 or less.

Further, the ester oligomer used as a plasticizer has a repeating unit including an ester bond of dicarboxylic acid and diol and is a relatively low molecular weight compound having about 2 to 100 repeating units. The ester oligomer is preferably an aliphatic ester oligomer. This is because the action of cellulose acylate as a plasticizer is more reliable.

The dicarboxylic acid is more preferably an aliphatic dicarboxylic acid having 2 to 10 carbon atoms. The diol is more preferably an aliphatic diol having 2 to 10 carbon atoms. This is because the use of an aliphatic dicarboxylic acid and an aliphatic diol makes it possible to impart flexibility to the cellulose acylate film 13 and decomposition products which inhibit a reduction in the contact angle after 15 seconds, which will be described later, are not easily formed. Examples of the aliphatic carboxylic acid include malonic acid, succinic acid, glutaric acid, adipic acid, sebacic acid, azelaic acid, cyclohexanedicarboxylic acid, maleic acid, and fumaric acid. Examples of the aliphatic diol include ethanediol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 1,4-hexanediol, 1,4-cyclohexanediol, and 1,4-cyclohexane dimethanol. It is also preferable that the terminal hydroxyl group and/or acid group of the ester oligomer are sealed with a monocarboxylic acid or monoalcohol. Of these, an oligomer having an ester of adipic acid and ethylene glycol as a repeating unit, an oligomer having an ester of succinic acid and ethylene glycol as a repeating unit, an oligomer having an ester of terephthalic acid and ethylene glycol, and an ester of phthalic acid and ethylene glycol as repeating units and the like are preferable. In the embodiment, as an ester, an ester oligomer from adipic acid and ethanediol (having a number average molecular weight of about 1,000 obtained by a method for quantitative determination of terminal hydroxyl groups) is used.

The mass of the ester oligomer is preferably at most 30%, that is, 30% or less with respect to the mass of the cellulose acylate. That is, in a case where the mass of the cellulose acylate (including saponified cellulose acylate in the saponified layer 14) in the cellulose acylate film 13 is MA and the mass of the ester oligomer in the cellulose acylate film 13 is MB, a mass ratio (unit: %) obtained by (MB/MA)×100 is 30% or less in the cellulose acylate film 13. By setting the mass ratio to 30% or less, compared to a case of a mass ratio of more than 30%, precipitation of the ester oligomer is suppressed, and thus it is possible to suppress precipitation of the ester oligomer during heating forming and to suppress an increase in the contact angle of the saponified layer 14 in the formed body 10. The mass ratio in the cellulose acylate film 13 is more preferably 4% or more and 30% or less and even more preferably 10% or more and 25% or less.

The sugar ester derivative will be described in detail below. The sugar ester derivative may be either an ester derivative of a monosaccharide or an ester derivative of a polysaccharide. The cellulose acylate film 13 may include both an ester derivative of a monosaccharide and an ester derivative of a polysaccharide.

The monocarboxylic acid used for esterifying all of, or a part of, OH groups in the monosaccharide structure or polysaccharide structure is not particularly limited and known aliphatic monocarboxylic acid, alicyclic monocarboxylic acid, aromatic monocarboxylic acid, and the like can be used. The carboxylic acid to be used here may be a single kind, or any mixture of two or more kinds thereof. Examples of sugars include monosaccharides such as glucose, galactose, mannose, fructose, xylose, and arabinose, and polysaccharides such as lactose, sucrose, nystose, 1F-fructosyl nystose, stachyose, maltitol, lactitol, lactulose, cellobiose, maltose, cellotriose, maltotriose, raffinose, kestose, gentiobiose, gentiotriose, gentiotetraose, xylotriose, and galactosyl sucrose. Preferable are glucose, fructose, sucrose, kestose, nystose, 1F-fructosyl nystose, and stachyose, and more preferable are sucrose, and glucose. In addition, oligosaccharides can also be used as polysaccharides. The oligosaccharides are produced by making an enzyme such as amylase act on starch, sucrose or the like, and examples of the oligosaccharides include maltooligosaccharides, isomaltooligosaccharide, fructooligosaccharides, galactooligosaccharides, and xylooligos accharides.

Preferable examples of the aliphatic monocarboxylic acid include saturated fatty acids such as acetic acid, propionic acid, butyric acid, isobutyric acid, valeric acid, caproic acid, enanthic acid, caprylic acid, peralgonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, and lacceric acid, unsaturated fatty acids such as undecylenic acid, oleic acid, sorbic acid, linoleic acid, linolenic acid, arachidonic acid, and octenoic acid, and alicyclic monocarboxylic acids such as cyclopentane carboxylic acid, cyclohexane carboxylic acid, and cyclooctane carboxylic acid.

Preferable examples of the aromatic monocarboxylic acid include benzoic acid, aromatic monocarboxylic acids obtained by introducing an alkyl group or alkoxy group into the benzene ring of benzoic acid, such as toluic acid; cinnamic acid, aromatic monocarboxylic acids having two or more benzene rings, such as benzylic acid, biphenyl carboxylic acid, naphthalene carboxylic acid, and tetralin carboxylic acid, and derivatives thereof. Benzoic acid and naphthyl acid are particularly preferable.

The mass of the sugar ester derivative is preferably at most 15%, that is, 15% or less with respect to the mass of the cellulose acylate, and is 15% or less in the cellulose acylate film 13 in the embodiment. In a case where the mass of the cellulose acylate (including saponified cellulose acylate in the saponified layer 14) in the cellulose acylate film 13 is MA and the mass of the sugar ester derivative in the cellulose acylate film 13 is MC, the mass ratio (unit: %) is obtained by (MC/MA)×100. By setting the mass ratio to 15% or less, compared to a case of a mass ratio of more than 15%, precipitation of the sugar ester derivative is suppressed, and thus it is possible to suppress precipitation of the sugar ester derivative during heating forming and to suppress an increase in the contact angle of the saponified layer 14 in the formed body 10. The mass ratio in the cellulose acylate film 13 is more preferably 4% or more and 15% or less and even more preferably 6% or more and 15% or less.

The cellulose acylate film 13 may include, in addition to the cellulose acylate and the plasticizer, various additives such as a plasticizer, an ultraviolet absorbent, and a deterioration preventing agent, and/or, for example, fine particles for preventing attachment between the cellulose acylate films 13.

The cellulose acylate film 13 is provided for use, for example, in a state in which the adhesive layer 12 is provided on the second film surface 13b. In this example, in the cellulose acylate film 13, the saponified layer 14 forms the first film surface 13a of the cellulose acylate film 13, but there is no limitation thereto. That is, the saponified layer 14 may be provided so as to form the second film surface 13b in addition to the first film surface 13a. In this case, the adhesive layer 12 is provided on any one of the saponified layer which forms the first film surface 13a or the saponified layer which forms the second film surface 13b in a layered manner.

Figure 3:
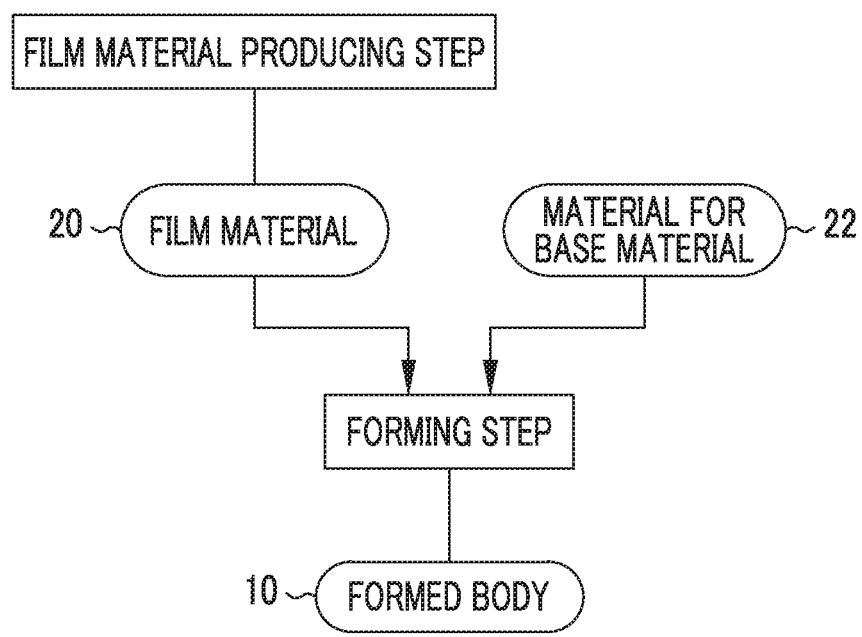
FIG. 3 is a flowchart illustrating a method of producing the formed body.

As shown in FIG. 3, the formed body 10 is produced by a film material producing step of producing a film material 20, and a forming step of integrally forming the film material 20 and a material 22 for a base material to form the formed body 10. In the forming step, the film material 20 is formed into the cellulose acylate film 13 of the formed body 10 and the material 22 for a base material is formed into the base material 11 of the formed body 10.

The film material producing step will be described below. In this example, the film material 20 is produced by a solution film formation method. Specifically, a polymer solution including TAC as cellulose acylate (hereinafter, referred to as a dope) is cast on a support to form a cast film, and the cast film is peeled off from the support and dried to produce the film material. In a case where the cellulose acylate film 13 is not required to have an antifogging function, in the forming step, the film material (hereinafter, referred to as a film material before a saponification treatment) is fed to a forming apparatus 50 which will be described later. In the embodiment, in order to impart antifogging properties to the cellulose acylate film 13, an alkali solution, as a saponification liquid, is applied to one film surface of the film material before a saponification treatment, and the applied film material is heated and washed with water, thereby producing the saponified film material. Accordingly, in the embodiment, in the forming step, the saponified film material is fed to the forming apparatus 50 which will be described later as the film material 20. It is preferable that isopropyl alcohol is incorporated into the saponification liquid, and in the embodiment, the same is applied. The saponified layer 14 is a region formed in a layered state by saponifying cellulose acylate by a saponification treatment by application and heating. The cellulose acylate layer 15 is a non-saponified portion of the film material 20 in which the film material is not saponified, that is, the remaining portion excluding the saponified layer 14. Accordingly, the above-described amount of acyl groups Y is equal to the amount of acyl groups in an arbitrary range of 2 μm of the film material before a saponification treatment in the thickness direction.

Figure 4:
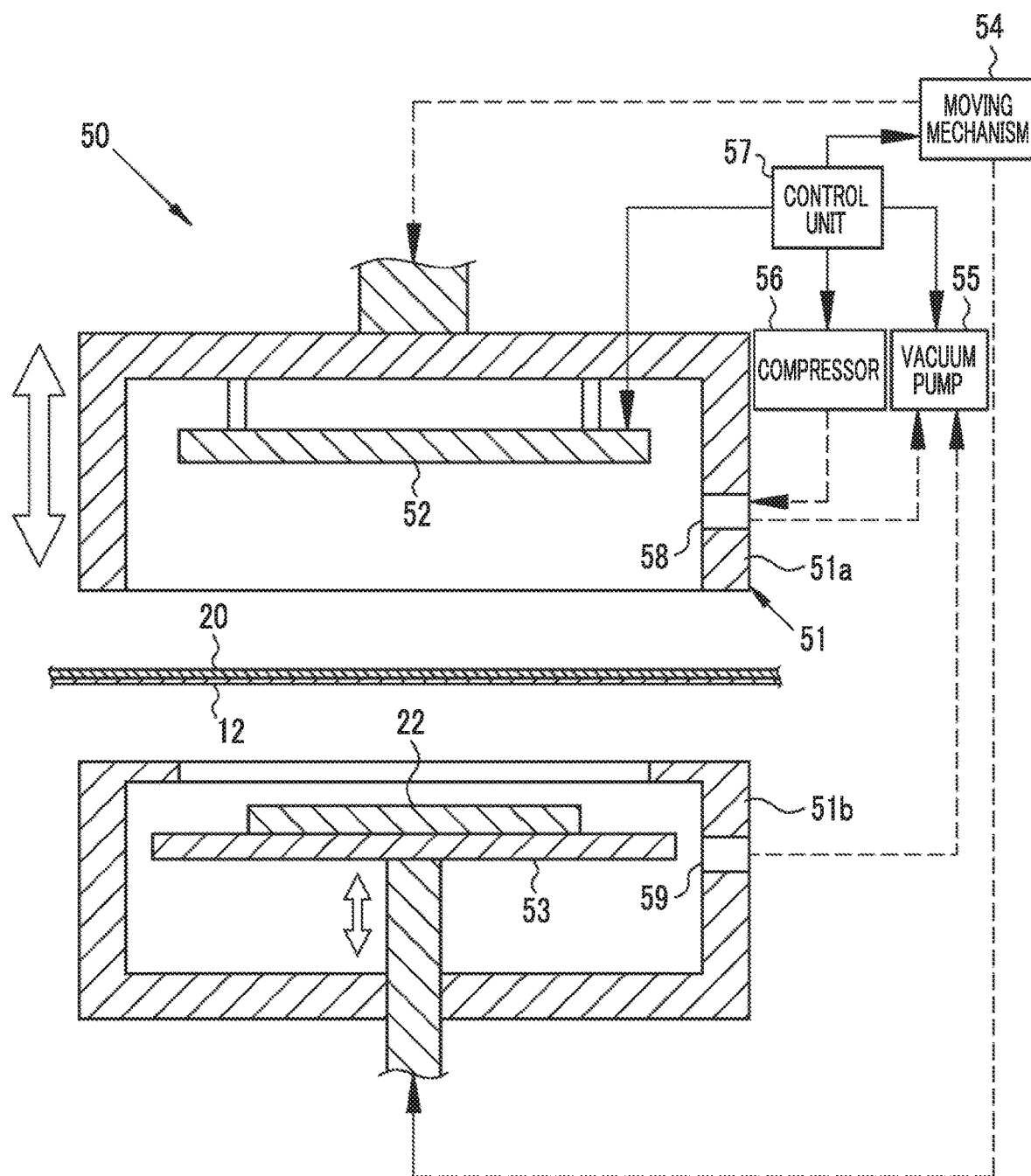
FIG. 4 is a schematic cross-sectional view of a forming apparatus.

The forming apparatus 50 shown in FIG. 4 is provided for integrally forming the film material 20 and the material 22 for a base material to form the formed body 10. The forming apparatus 50 comprises a chamber 51, a heater 52, a table 53, a moving mechanism 54, a vacuum pump 55, a compressor 56, and a control unit 57, and is an example of an apparatus for performing vacuum pressure forming. However, the forming method is not limited to vacuum pressure forming and for example, methods such as vacuum forming, pressure forming, film insert molding, and in-mold forming may be used. Among these forming methods, in the case of vacuum pressure forming, vacuum forming, and pressure forming, as the material 22 for a base material, a material for a base material molded into a desired shape by injection molding or the like in advance is fed to the forming apparatus 50. In the embodiment, a dome-shaped material 22 for a base material is fed to the forming apparatus 50. However, in FIG. 4, for the convenience of description, the material 22 for a base material is drawn in a plate-like shape. In the case of film insert molding and in-mold forming, as the material for a base material, the thermoplastic resin for forming the base material 11 is fed to the forming apparatus 50. As the forming apparatus 50, in the embodiment, a commercially available apparatus, for example, a three dimension overlay method (TOM) forming machine (trade name: next generation forming (NGF) machine) manufactured by Fu-se Vacuum Forming Ltd. is used.

The chamber 51 includes an upper chamber 51a and a lower chamber 51b. The upper chamber 51a is freely moved in a vertical direction in FIG. 4, that is, in a direction in which a distance between the upper chamber 51a and the lower chamber 51b is increased or reduced. The upper chamber 51a is lowered and the upper chamber 51a and the lower chamber 51b are closely contact with each other so that the inside of the chamber 51 is turned to an airtight state. In the upper chamber 51a, a heater 52 for heating the film material 20 is provided. In the lower chamber 51b, a table 53 for placing the material 22 for a base material is provided.

The heater 52 heats the film material 20 by emitting, for example, far infrared rays (a region where the wavelength range is approximately 4 μm or more and 1000 μm or less). The table 53 is freely moved relative to the lower chamber 51b in the vertical direction in FIG. 4. The moving mechanism 54 moves the upper chamber 51a and the table 53 respectively in the vertical direction in FIG. 4. The vacuum pump 55 is connected with an exhaust hole 58 provided in the upper chamber 51a and an exhaust hole 59 provided in the lower chamber 51b. The vacuum pump 55 discharge air from each of the exhaust holes 58 and 59 in a case where the inside of the chamber 51 is in an airtight state, and the inside of the chamber 51 is turned to a vacuum state. The compressor 56 is connected with the exhaust hole 58 provided in the upper chamber 51a and compressed air is injected into the upper chamber 51a through the exhaust hole 58. The moving mechanism 54, the heater 52, the vacuum pump 55, and the compressor 56 are controlled by the control unit 57. In the forming apparatus 50, a thermometer (not shown) for measuring the temperature of the film material 20 is provided, and the control unit 57 controls the amount of heat generated by the heater 52 based on the temperature of the thermometer. As the thermometer, for example, a noncontact type thermometer for measuring the temperature of the surface of the film material 20 without contact may be used.

The procedure of producing the formed body 10 using the forming apparatus 50 will be described. The adhesive layer 12 is provided on one surface of the film material 20 in advance. In the embodiment, the adhesive layer 12 is provided on the surface of the film material 20 close to the cellulose acylate layer 15. The adhesive layer 12 is formed by using a commercially available adhesive, for example, an acrylic pressure sensitive adhesive sheet manufactured by Soken Chemical & Engineering Co., Ltd. in the embodiment. The film material 20 is set between the upper chamber 51a and the lower chamber 51b in a state in which the adhesive layer 12 is directed to the lower chamber 51b. In a case where a protective material (not shown) for protecting the saponified layer 14 is provided on the film material 20, the film material is set in a state in which the protective material is peeled off. The material of the protective material is not particularly limited but any one of polyethylene, polypropylene, or PET is preferable.

Next, the material 22 for a base material is set on the table 53. The upper chamber 51a is lowered and in a state in which the film material 20 is interposed between the upper chamber 51a and the lower chamber 51b, the inside of the chamber 51 is turned to an airtight state. Then, the vacuum pump 55 is activated so that the inside of the chamber 51 is turned to a vacuum state.

In the vacuum state, the heater 52 is turned on to heat the film material 20. By the heating, the film material 20 hangs by its own weight but by adjusting the degree of vacuum in the upper chamber 51a and the degree of vacuum in the lower chamber 51b, the film material 20 is set in a substantially horizontal state. Meanwhile, the temperature of the film material 20 is measured with the thermometer (not shown).

After the film material 20 reaches a predetermined temperature (for example, 190° C.), the table 53 in the lower chamber 51b is raised. Thus, material 22 for a base material on the table 53 is covered with the film material 20. In this state, by turning the inside of the upper chamber 51a to an atmospheric pressure state, the film material 20 is pressed against the material 22 for a base material. Further, the compressor 56 is activated and compressed air is injected into the upper chamber 51a so that the material 22 for a base material is closely attached to the film material 20. Thus, the film material 20 is formed and laminated on the material 22 for a base material. Thereafter, the inside of the upper chamber 51a and the lower chamber 51b is turned to an atmospheric pressure state and the upper chamber 51a is raised to remove the formed body 10. In a case where a plate-like formed body is produced, the above procedure is also performed.

EXAMPLES

[Example 1] to [Example 14]

14 kinds of film materials 20 were made from dopes by a solution film formation method. These 14 kinds of film materials 20 and plate-shaped materials for a base material were integrally formed respectively to produce 14 kinds of formed bodies. These formed bodies were used for Examples 1 to 14.

The dope was prepared by putting the composition having the following formulation into an airtight container, and completely dissolving the materials by stirring while maintaining the temperature at 40° C. under normal pressure. The raw material of TAC is linter. Fine particles are R972 (silica, manufactured by NIPPON AEROSIL Co., Ltd.). The fine particles were dispersed in a solution obtained by dissolving TAC in a solvent which is a mixture of dichloromethane and methanol by premixing. Then, the dispersion liquid was put into the airtight container to form a composition having the following formulation. After the composition was left to stand, the solution was filtered using a filter paper (No. 63, manufactured by Advantec Toyo Kaisha, Ltd.) was used in a state in which the solution was maintained at 30° C., and subjected to a defoaming operation. Thus, a dope was obtained.

| First component | 100 parts by mass |
| --- | --- |
| Second component | parts by mass shown in each column of "amount" in Table 1 |
| Dichloromethane | 635 parts by mass |
| Methanol | 125 parts by mass |
| Fine particles | 1.3 parts by mass |

As shown in Table 1, the first component is cellulose acylate. In Table 1, "CA" is put in the column of "Material" of "First component". In this cellulose acylate, all acyl groups are acetyl groups and the viscosity average polymerization degree is 320. The acyl group substitution degree of the cellulose acylate is shown in the column of "Acyl group substitution degree" in Table 1.

The second component is a plasticizer, and A to C are put in the column of "Material" of "Second component" in Table 1. A is an oligomer having an ester of from adipic acid and ethylene glycol as a repeating unit (the molecular weight determined by a method for quantitative determination of terminal functional groups is 1000). B is an oligomer having an ester of terephthalic acid and ethylene glycol, and an ester of phthalic acid and ethylene glycol as repeating units (the molecular weight determined by a method for quantitative determination of terminal functional groups is 700). C is a benzoic acid ester of sucrose of a sugar ester derivative (Monopet SB, manufactured by Daiichi Kogyo Seiyaku Co., Ltd.).

TABLE 1

| | First component | | Second component | | | | | | Moisture |
| --- | --- | --- | --- | --- | --- | --- | --- | --- | --- |
| | Material | Acyl group substitution degree | Material | Amount (parts by mass) | Thickness (μm) | Presence of saponified layer | Contact angle (°) | Acyl group ratio X/Y | permeability 40° C./90% RH (g/m² · 24 h) |
| Film A | CA | 2.86 | A | 15 | 40 | Presence | 20 | 0.60 | 873 |
| Film B | CA | 2.86 | A | 25 | 35 | Presence | 16 | 0.50 | 1030 |
| Film C | CA | 2.40 | B | 20 | 60 | Presence | 20 | 0.60 | 1020 |
| Film D | CA | 2.86 | C | 8 | 40 | Presence | 24 | 0.65 | 820 |
| Film E | CA | 2.86 | A | 13 | 25 | Presence | 18 | 0.60 | 1300 |
| Film F | CA | 2.86 | A | 13 | 15 | Presence | 18 | 0.60 | 1810 |
| Film G | CA | 2.86 | A | 15 | 100 | Presence | 17 | 0.60 | 550 |
| Film H | CA | 2.86 | A | 15 | 40 | Presence | 15 | 0.30 | 873 |
| Film I | CA | 2.86 | A | 15 | 40 | Presence | 25 | 0.80 | 873 |
| Film J | CA | 2.86 | A | 4 | 40 | Presence | 17 | 0.60 | 1210 |
| Film K | CA | 2.86 | A | 30 | 40 | Presence | 22 | 0.60 | 830 |
| Film L | CA | 2.86 | A | 15 | 80 | Presence | 20 | 0.60 | 610 |
| Film M | CA | 2.86 | C | 4 | 40 | Presence | 22 | 0.60 | 950 |
| Film N | CA | 2.86 | C | 15 | 40 | Presence | 26 | 0.70 | 750 |
| Film W | CA | 2.86 | D | 15 | 80 | Presence | 28 | 0.80 | 450 |
| Film X | CA | 2.86 | A | 15 | 120 | Presence | 18 | 0.60 | 480 |
| Film Y | CA | 2.86 | D | 12 | 120 | Presence | 45 | 0.80 | 380 |
| Film Z | PET | — | — | 0 | 100 | Absence | 60 | — | 20 |

The dope whose temperature was adjusted to 30° C. was cast on the support. The support is an endless belt formed of stainless steel. The cast film was exposed to hot air at 100° C. immediately after the film was formed and was dried. After 120 seconds had elapsed from the film formation, the cast film was peeled off from the support at a peeling tension of 150 N/m to form a film material before a saponification treatment. The temperature of the support at the peeling position was set to 10° C. The amount of the remaining solvent of the cast film at the time of peeling-off was 100% by mass.

The formed film material before a saponification treatment was dried while the film was being transported by a large number of rolls arranged in a transport path in a state in which the tension in the longitudinal direction was set to 100 N/m. The drying was performed by transporting the film in a first drying zone whose temperature was set to 80° C. for 5 minutes and then further transporting the film in a second drying zone whose temperature was set to 120° C. for 10 minutes. After drying, the film material before a saponification treatment was wound in a roll shape and thus a film roll was obtained. The width of the film material before a saponification treatment was 1.5 m and the winding length of the film roll was 2,000 m. The amount of the remaining solvent of the film material before a saponification treatment at the time of winding was 0.3%.

The obtained film material was saponified to produce 14 kinds of film materials 20. These obtained films were used for A to N. The treatment time and the treatment temperature of saponification were appropriately changed. Specifically, each of the films A to N was produced in the following manner. The film material before a saponification treatment was unwound from the film roll and transported. A saponification liquid was applied to one film surface of the film material before a saponification treatment by a coating device provided on the transport path. The formulation of the saponification liquid is as follows. In the following formulation, % is a mass percentage.

| | |
|---|---|
| Potassium hydroxide (KOH) | 3.3% |
| Isopropyl alcohol | 88% |
| Water | 3% |
| Propylene glycol | 5% |
| Surfactant | 0.04% |

The film material to which the saponification liquid was applied was guided to a heating chamber provided on the transport path and heated while the film was being transported. Then, the film was fed to a water tank storing water and washed with water. Regarding each of the long film materials 20 obtained as described above, the thickness, the contact angle after 15 seconds, the acyl group ratio, and the moisture permeability were respectively obtained. The methods of obtaining the contact angle after 15 seconds and the acyl group ratio are as described above. The thickness is an average value of values measured at an interval of 0.5 mm in the width direction using a contact type thickness meter. The moisture permeability was evaluated based on Japanese Industrial Standards JIS Z-0208. The moisture permeability was evaluated at 40° C. and 90% RH. These results are shown in Table 1.

Each of the obtained film materials 20 (films A to N) and the material for a base material were integrally formed using the forming apparatus 50 and thus 14 kinds of formed bodies were produced. A commercially available PC plate (PC1600, manufactured by C.I. TAKIRON Corporation) formed of PC having a glass transition point of 150° C. and having a plate-like shape with one side of a length of 100 mm and a thickness (height) of 5 mm was used as the material for a base material. Regarding the material for a base material, in Table 2, "PC" is put in the column of "Material" of "Base material" and "Plate" is put in the column of "Shape". The forming temperature was set to 190° C.

Regarding each of the obtained formed bodies, the rainbow unevenness, the existence and degree of the influence of outgas, the contact angle, and the workability were evaluated using the following evaluation methods and the standards. Each evaluation result is shown in Table 2.

(1) Rainbow Unevenness

The formed body was irradiated with light of a fluorescent lamp from the base material side, visually observed and evaluated based on the following standards.

Pass: Color unevenness was not confirmed.
Fail: Color unevenness was confirmed.

(2) Existence and Degree of Influence of Outgas

The formed body was stored in air at 80° C. and 85% RH for 24 hours, bubbles and peeling-off were visually observed, and the existence and degree of the influence of outgas were evaluated based on the following standards. 2 and 3 are pass levels. The evaluation results are shown in the column "Outgas".

3: Bubbles and peeling were not generated.
2: Bubbles and/or peeling was generated, but the area in which bubbles and/or peeling was generated was 20% or less of the total area of the laminated portion.
1: The area in which bubbles and/or peeling was generated was more than 20% of the total area of the laminated portion.

(3) Contact Angle

The contact angle after 15 seconds was obtained as described above and the contact angle was evaluated. As described above, in a case where the contact angle is 35° or less, long-term antifogging properties are particularly excellent.

(4) Workability

The ease of processing the cellulose acylate film to the PC plate was evaluated based on the following standards and the evaluation result was evaluated as workability. 3 and 4 are pass levels.

TABLE 2

| | | Base material | | Forming | Evaluation result of formed body | | | |
|---|---|---|---|---|---|---|---|---|
| | | | | | Rainbow | | Contact | |
| | Film | Material | Shape | temperature (° C.) | unevenness | Outgas | angle (°) | Workability |
| Example 1 | Film A | PC | Plate | 190 | Pass | 3 | 25 | 3 |
| Example 2 | Film B | PC | Plate | 190 | Pass | 3 | 24 | 3 |
| Example 3 | Film C | PC | Plate | 190 | Pass | 3 | 27 | 4 |
| Example 4 | Film D | PC | Plate | 190 | Pass | 3 | 28 | 3 |
| Example 5 | Film E | PC | Plate | 190 | Pass | 3 | 25 | 4 |
| Example 6 | Film F | PC | Plate | 190 | Pass | 3 | 26 | 4 |
| Example 7 | Film G | PC | Plate | 190 | Pass | 2 | 25 | 3 |
| Example 8 | Film H | PC | Plate | 190 | Pass | 3 | 18 | 3 |
| Example 9 | Film I | PC | Plate | 190 | Pass | 3 | 35 | 3 |
| Example 10 | Film J | PC | Plate | 190 | Pass | 3 | 20 | 3 |
| Example 11 | Film K | PC | Plate | 190 | Pass | 3 | 27 | 3 |
| Example 12 | Film L | PC | Plate | 190 | Pass | 2 | 27 | 3 |
| Example 13 | Film M | PC | Plate | 190 | Pass | 2 | 29 | 3 |
| Example 14 | Film N | PC | Plate | 190 | Pass | 3 | 33 | 3 |
| Comparative Example 1 | Film W | PC | Plate | 190 | Pass | 1 | 43 | 2 |
| Comparative Example 2 | Film X | PC | Plate | 190 | Pass | 1 | 25 | 2 |
| Comparative Example 3 | Film Y | PC | Plate | 190 | Pass | 1 | 60 | 1 |
| Comparative Example 4 | Film Z | PC | Plate | 190 | Fail | 1 | 60 | 2 |

4: Deformation occurs along the end portion of the PC plate.

3: Partial floating occurs at the end portion of the PC plate but a bending process can be applied.

2: A bending process can be applied but floating occurs at the end portion of the PC plate.

1: A bending process cannot be applied and floating occurs at the end portion of the PC plate.

[Comparative Example 1] to [Comparative Example 4]

By changing the material of the first component, the material and amount of the second component, the thickness, and the like, films W to Y were produced from dopes by a solution film formation method. A commercially available optical use polyethylene terephthalate film formed from polyethylene terephthalate was designated as Film Z. In Table 1, "PET" is put in the column of "Material" of "First component". Regarding the films W to Z, the thickness, the contact angle after 15 seconds, the acyl group ratio, and the moisture permeability were respectively obtained. These results are shown in Table 1. However, the film Z does not have an acyl group, and thus "-" is put in the columns of "Acyl group substitution degree" and "Acyl group ratio" in Table 1. "D" in the column of "Material" of "Second component" in Table 1 refers to triphenylphosphate (TPP) and biphenyldiphenylphosphate (BDP). As in Examples 1 to 14, the films W to Z and the plate-shaped material for a base material were integrally formed using the forming apparatus 50, and 4 kinds of formed bodies were produced. These formed bodies were used for Comparative Examples 1 to 4.

Regarding each of the obtained formed bodies, the rainbow unevenness, the existence and degree of the influence of outgas, the contact angle, and the workability were evaluated using the same methods and the same standards as in the evaluation of Examples. Each evaluation result is shown in Table 2.

[Example 21] to [Example 26]

The films A to E, and J, and the material 22 for a base material were integrally formed using the forming apparatus 50 and 6 kinds of formed bodies 10 were produced. These formed bodies were used for Examples 21 to 26. An acrylic dome formed of polymethyl methacrylate (PMMA) which is acryl having a glass transition point of 100° C. and having a dome shape with a diameter of 100 mm and a thickness of 2 mm was prepared and this dome was used as the material 22 for a base material. In Table 3, "Acryl" is put in the column of "Material" of "Base material", "Dome" is put in the column of "Shape", and "100" is put in the column of "Diameter". The forming temperature was set to 190° C. The "Diameter" refers to the outer diameter.

Regarding each of the obtained formed bodies 10, the rainbow unevenness, the existence and degree of the influence of outgas, the contact angle, and the formability were evaluated using the same methods and the same standards as in the evaluation of Examples 1 to 14. Each evaluation result is shown in Table 3.

(5) Formability

The easiness of forming the cellulose acylate film into the acrylic dome was evaluated based on the following standards and the evaluation result was evaluated as formability. 3 to 5 are pass levels.

5: Floating did not occur.

4: Very slight floating occurred at the end portion of the acrylic dome, but floating did not occur except at the end portion.

3: Floating occurred at the end portion of the acrylic dome, but floating did not occur except at the end portion.

2: Floating occurred from the end portion to the center portion of the acrylic dome.

1: Wrinkles were generated in the entire laminated portion.

[Comparative Example 11] and [Comparative Example 12]

The films X and Y and the material 22 for a base material were integrally formed using the forming apparatus 50 and 2 kinds of formed bodies were produced. These formed bodies were used for Comparative Examples 11 and 12.

Regarding each of the obtained formed bodies, the rainbow unevenness, the existence and degree of the influence of outgas, the contact angle, and the formability were evaluated using the same methods and the same standards as in the evaluation of Examples 21 to 26. Each evaluation result is shown in Table 3.

TABLE 3

| | | Base material | | | Forming | Evaluation result of formed body | | | |
|---|---|---|---|---|---|---|---|---|---|
| | Film | Material | Shape | Diameter (mm) | temperature (° C.) | Rainbow unevenness | Outgas | Contact angle (°) | Workability |
| Example 21 | Film A | Acryl | Dome | 100 | 190 | Pass | 4 | 25 | 4 |
| Example 22 | Film B | Acryl | Dome | 100 | 190 | Pass | 4 | 24 | 4 |
| Example 23 | Film C | Acryl | Dome | 100 | 190 | Pass | 4 | 27 | 5 |
| Example 24 | Film D | Acryl | Dome | 100 | 190 | Pass | 4 | 28 | 3 |
| Example 25 | Film E | Acryl | Dome | 100 | 190 | Pass | 4 | 25 | 5 |
| Example 26 | Film J | Acryl | Dome | 100 | 190 | Pass | 4 | 20 | 3 |
| Comparative Example 11 | Film X | Acryl | Dome | 100 | 190 | Pass | 2 | 25 | 2 |
| Comparative Example 12 | Film Y | Acryl | Dome | 100 | 190 | Pass | 2 | 60 | 1 |

What is claimed is:

1. A formed body comprising:

a transparent base material that is formed of a thermoplastic resin;

an adhesive layer that is provided on a surface of the base material; and a film that is provided on a surface of the adhesive layer opposite to the base material, has a thickness in a range of 15 μm or more and 100 μm or less, and is formed of cellulose acylate including an ester oligomer having a molecular weight in a range of 700 or more and 5000 or less, wherein the film has a cellulose acylate layer that is provided on a side close to the adhesive layer and is formed of the cellulose acylate, and a saponified layer that is provided on a side opposite to the adhesive layer and contains the cellulose acylate which is saponified, in a case where an amount of acyl groups in the saponified layer is X and an amount of acyl groups in the cellulose acylate layer is Y, an acyl group ratio determined by X/Y is at most 0.7, and wherein, in a surface of the saponified layer, a contact angle of pure water 15 seconds after the pure water is dropped is 35 degrees or less.

2. The formed body according to claim 1, wherein a mass of the ester oligomer is at most 30% with respect to a mass of the cellulose acylate.

3. The formed body according to claim 1, wherein the base material is formed of acryl or polycarbonate.

4. The formed body according to claim 1, wherein the base material is formed in a curved sheet shape.

5. A formed body comprising:

a transparent base material that is formed of a thermoplastic resin;

an adhesive layer that is provided on a surface of the base material; and a film that is provided on a surface of the adhesive layer opposite to the base material, has a thickness in a range of 15 μm or more and 100 μm or less, and is formed of cellulose acylate including a sugar ester derivative, wherein the film has a cellulose acylate layer that is provided on a side close to the adhesive layer and is formed of the cellulose acylate, and a saponified layer that is provided on a side opposite to the adhesive layer and contains the cellulose acylate which is saponified, in a case where an amount of acyl groups in the saponified layer is X and an amount of acyl groups in the cellulose acylate layer is Y, an acyl group ratio determined by X/Y is at most 0.7, and wherein, in a surface of the saponified layer, a contact angle of pure water 15 seconds after the pure water is dropped is 35 degrees or less.

6. The formed body according to claim 5, wherein a mass of the sugar ester derivative is at most 15% with respect to a mass of the cellulose acylate.

* * * * *